(12) United States Patent
Mason

(10) Patent No.: US 10,351,777 B2
(45) Date of Patent: Jul. 16, 2019

(54) SIMULTANEOUS PYROLYSIS AND COMMUNITION FOR FUEL FLEXIBLE GASIFICATION AND PYROLYSIS

(71) Applicant: All Power Labs, Inc., Berkeley, CA (US)

(72) Inventor: James Mason, Berkeley, CA (US)

(73) Assignee: All Power Labs, Inc., Berkeley, CA (US)

(*) Notice: Subject to any disclaimer, the term of this patent is extended or adjusted under 35 U.S.C. 154(b) by 167 days.

(21) Appl. No.: 15/654,940

(22) Filed: Jul. 20, 2017

(65) Prior Publication Data

US 2017/0313944 A1  Nov. 2, 2017

Related U.S. Application Data

(62) Division of application No. 14/216,321, filed on Mar. 17, 2014, now Pat. No. 9,745,516.

(60) Provisional application No. 61/790,332, filed on Mar. 15, 2013.

(51) Int. Cl.
*C10B 49/02* (2006.01)
*C10B 53/02* (2006.01)
*C10J 3/66* (2006.01)
*C10J 3/48* (2006.01)

(52) U.S. Cl.
CPC ............. *C10B 49/02* (2013.01); *C10B 53/02* (2013.01); *C10J 3/487* (2013.01); *C10J 3/66* (2013.01); *Y02E 50/14* (2013.01); *Y02P 20/129* (2015.11)

(58) Field of Classification Search
CPC ........ C10J 2300/0916; C10J 2300/0909; C10J 2300/0906; C10J 3/485; C10J 2300/0946; C10J 2200/09; C10J 3/56; Y02P 20/145; Y02P 20/129; Y02P 30/20; Y02E 50/14
See application file for complete search history.

(56) References Cited

U.S. PATENT DOCUMENTS

| 2,572,051 A | 10/1951 | Parry |
| 2,984,602 A | 5/1961 | Nevens et al. |
| 3,034,979 A | 5/1962 | Nevens |
| 3,616,266 A * | 10/1971 | Hall ..................... C10B 1/10 201/12 |
| 3,807,324 A | 4/1974 | Williamitis |
| 4,497,637 A | 2/1985 | Purdy et al. |
| 4,823,712 A | 4/1989 | Wormer |
| 4,917,028 A | 4/1990 | Ganster et al. |
| 5,233,932 A * | 8/1993 | Robertson ............. F23G 5/033 110/101 R |

(Continued)

FOREIGN PATENT DOCUMENTS

| DE | 669332 | 12/1938 |
| DE | 102005000768 | 7/2006 |

(Continued)

*Primary Examiner* — Imran Akram
(74) *Attorney, Agent, or Firm* — Jeffrey Schox; Diana Lin

(57) ABSTRACT

A biomass thermal conversion system including a fixed bed drying zone; a fixed bed pyrolysis zone fluidly connected to the drying zone; a combustion zone fluidly connected to the pyrolysis zone by a material path; and a comminution mechanism arranged across the material path between the pyrolysis zone and the combustion zone, configured to grind char off a pyrolyzed surface of solid biomass and reduce a dimension of the solid biomass below a threshold size.

10 Claims, 4 Drawing Sheets

(56) References Cited

U.S. PATENT DOCUMENTS

| | | | |
|---|---|---|---|
| 5,296,005 A * | 3/1994 | Wolfe | C10B 7/10 |
| | | | 44/281 |
| 5,927,216 A | 7/1999 | Oga | |
| 6,084,139 A | 7/2000 | Van Der Giessen et al. | |
| 7,077,878 B1 | 7/2006 | Muehlen et al. | |
| 7,452,392 B2 | 11/2008 | Nick et al. | |
| 7,469,781 B2 | 12/2008 | Chataing et al. | |
| 7,622,693 B2 | 11/2009 | Foret | |
| 7,811,340 B2 | 10/2010 | Bayle et al. | |
| 7,932,065 B2 | 4/2011 | Medoff | |
| 7,950,339 B2 | 5/2011 | Shuman et al. | |
| 8,043,391 B2 | 10/2011 | Dinjus et al. | |
| 8,153,850 B2 | 4/2012 | Hall et al. | |
| 8,192,513 B2 | 6/2012 | Bohlig et al. | |
| 8,202,399 B2 | 6/2012 | Taylor | |
| 8,372,166 B2 | 2/2013 | Juvan | |
| 8,546,636 B1 | 10/2013 | Potgieter et al. | |
| 8,574,326 B2 | 11/2013 | Diebold et al. | |
| 8,603,204 B2 | 12/2013 | Rueger et al. | |
| 9,011,560 B2 | 4/2015 | Simmons et al. | |
| 9,150,803 B2 | 10/2015 | Jovanovic et al. | |
| 9,168,500 B2 | 10/2015 | Jiang et al. | |
| 9,249,358 B2 | 2/2016 | Song et al. | |
| 9,261,274 B2 | 2/2016 | Jiang et al. | |
| 9,464,245 B2 | 10/2016 | Gao et al. | |
| 2003/0010266 A1 * | 1/2003 | Ballantine | C10B 47/44 |
| | | | 110/229 |
| 2006/0037852 A1 * | 2/2006 | Noto | C10B 47/32 |
| | | | 202/118 |
| 2006/0112639 A1 * | 6/2006 | Nick | C10J 3/08 |
| | | | 48/198.1 |
| 2008/0149471 A1 * | 6/2008 | Wolfe | C10B 47/44 |
| | | | 201/8 |
| 2008/0236043 A1 * | 10/2008 | Dinjus | C10B 53/02 |
| | | | 48/197 R |
| 2009/0007484 A1 | 1/2009 | Smith | |
| 2010/0112242 A1 * | 5/2010 | Medoff | C08H 8/00 |
| | | | 428/22 |
| 2010/0151293 A1 * | 6/2010 | Hansen | C10B 47/44 |
| | | | 429/426 |
| 2010/0242353 A1 * | 9/2010 | Jovanovic | C01B 3/22 |
| | | | 44/639 |
| 2011/0209399 A1 * | 9/2011 | Bohlig | C10J 3/463 |
| | | | 44/589 |
| 2012/0145965 A1 * | 6/2012 | Simmons | C01B 3/24 |
| | | | 252/373 |
| 2012/0181483 A1 | 7/2012 | Simmons et al. | |
| 2013/0199919 A1 | 8/2013 | Li et al. | |
| 2013/0247448 A1 | 9/2013 | Ampulski et al. | |
| 2014/0338575 A1 | 11/2014 | Kobayashi et al. | |

FOREIGN PATENT DOCUMENTS

| | | |
|---|---|---|
| GB | 503509 | 4/1939 |
| WO | 139181 | 11/2011 |
| WO | 160163 | 12/2011 |

* cited by examiner

SIMULTANEOUS PYROLYSIS AND COMMUNITION FOR FUEL FLEXIBLE GASIFICATION AND PYROLYSIS

CROSS-REFERENCE TO RELATED APPLICATIONS

This application is a divisional of U.S. application Ser. No. 14/216,321, filed 17 Mar. 2014, which claims the benefit of U.S. Provisional Application Ser. No. 61/790,332, filed 15 Mar. 2013, which are both incorporated in their entirety by this reference. This application is related to U.S. application Ser. No. 14/216,206 filed 17 Mar. 2014, which is incorporated in its entirety by this reference.

TECHNICAL FIELD

This invention relates generally to the field of biomass thermal conversion, and more specifically to a new and useful communition method for gasification or pyrolysis machines.

BACKGROUND

Biomass thermal conversion is an attractive method for generating synthetic gas to run engines or to produce useful end products such as charcoal. Carbonaceous byproducts are typically inexpensive or free to source. Unfortunately, biomass byproducts come in a wide array of shapes and sizes, and extra machinery is usually required to pre-process the feedstock into forms acceptable to gasification or pyrolysis machines. This processing equipment is often expensive and difficult to operate, which challenges the ultimate attractiveness of biomass thermal conversion solutions.

Thus, there is a need in the field of biomass thermal conversion for system capable of utilizing a wide range of fuel shapes and sizes, without feedstock preprocessing on the front end. This invention provides such a solution through a novel "reactor-internal" fuel processing solution that reduces a wide range of input biomass feedstock to a common size of granulated char.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Gasifier with Char Grinder

Figure 1:
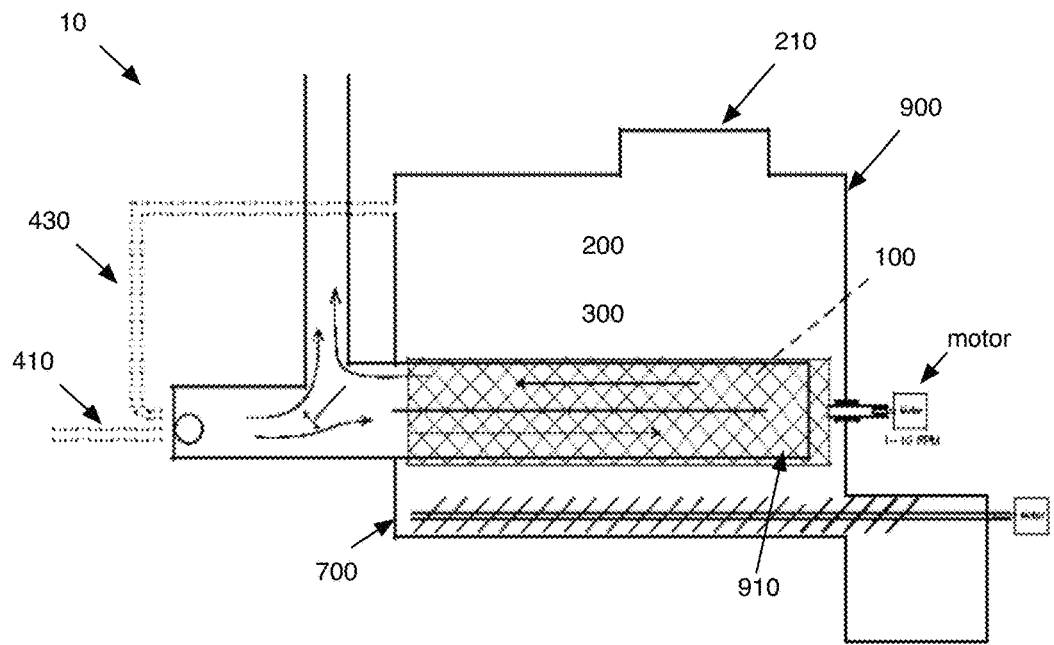
FIG. 1 is a variation of a horizontal pyrolysis retort with the char grinder.
Figure 6:
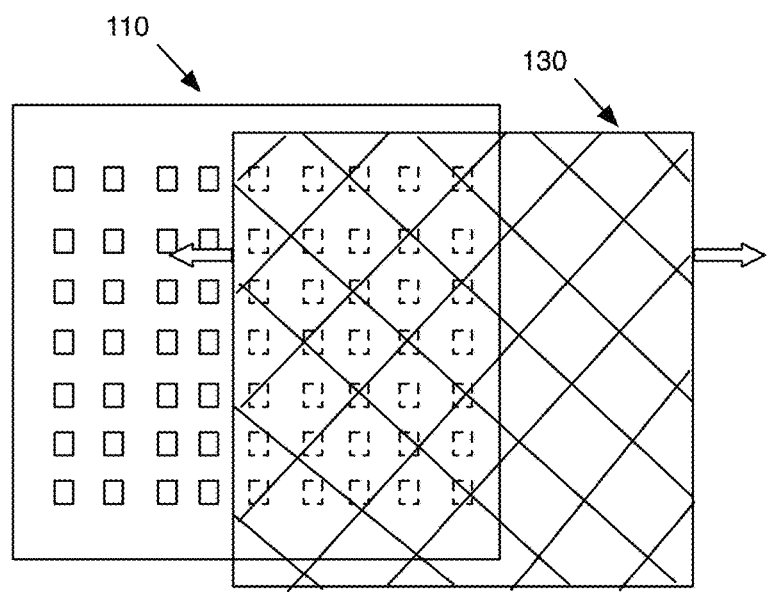
FIG. 6 is a sectional view of a variation of the char grinder.

As shown in FIG. 1, the biomass thermal conversion system 10 includes a drying zone 200, a pyrolysis zone 300, a combustion zone 400, and a char grinder 100. The char grinder 100 (comminution mechanism) preferably includes a body 110 and an abrading cage 130 in translational relation with the body 110, as shown in FIG. 6. This biomass thermal conversion system 10 functions to introduce comminution (e.g., granulation) as a concurrent, integrated, in-situ component of the pyrolysis process, such that granular biomass having a substantially uniform form factor can be output into subsequent gasification stages or charcoal removal systems despite biomass input having a variety of non-uniform shapes and sizes.

Figure 2:
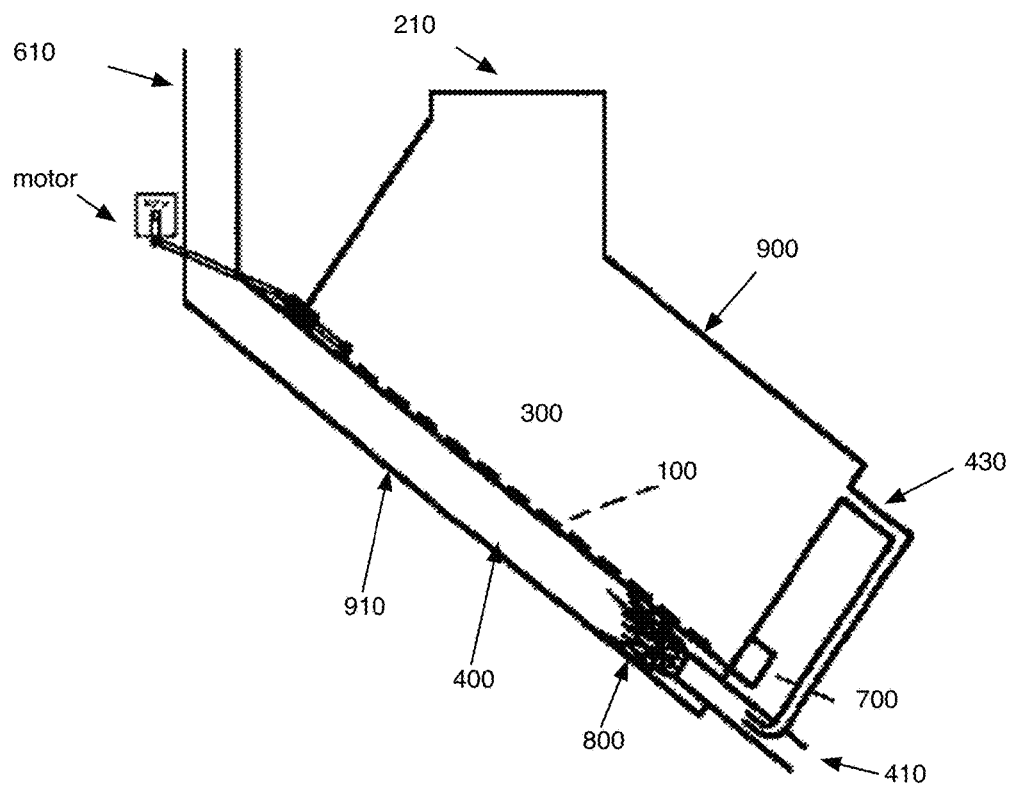
FIG. 2 is a variation of a slanted pyrolysis retort with the char grinder.
Figure 3:
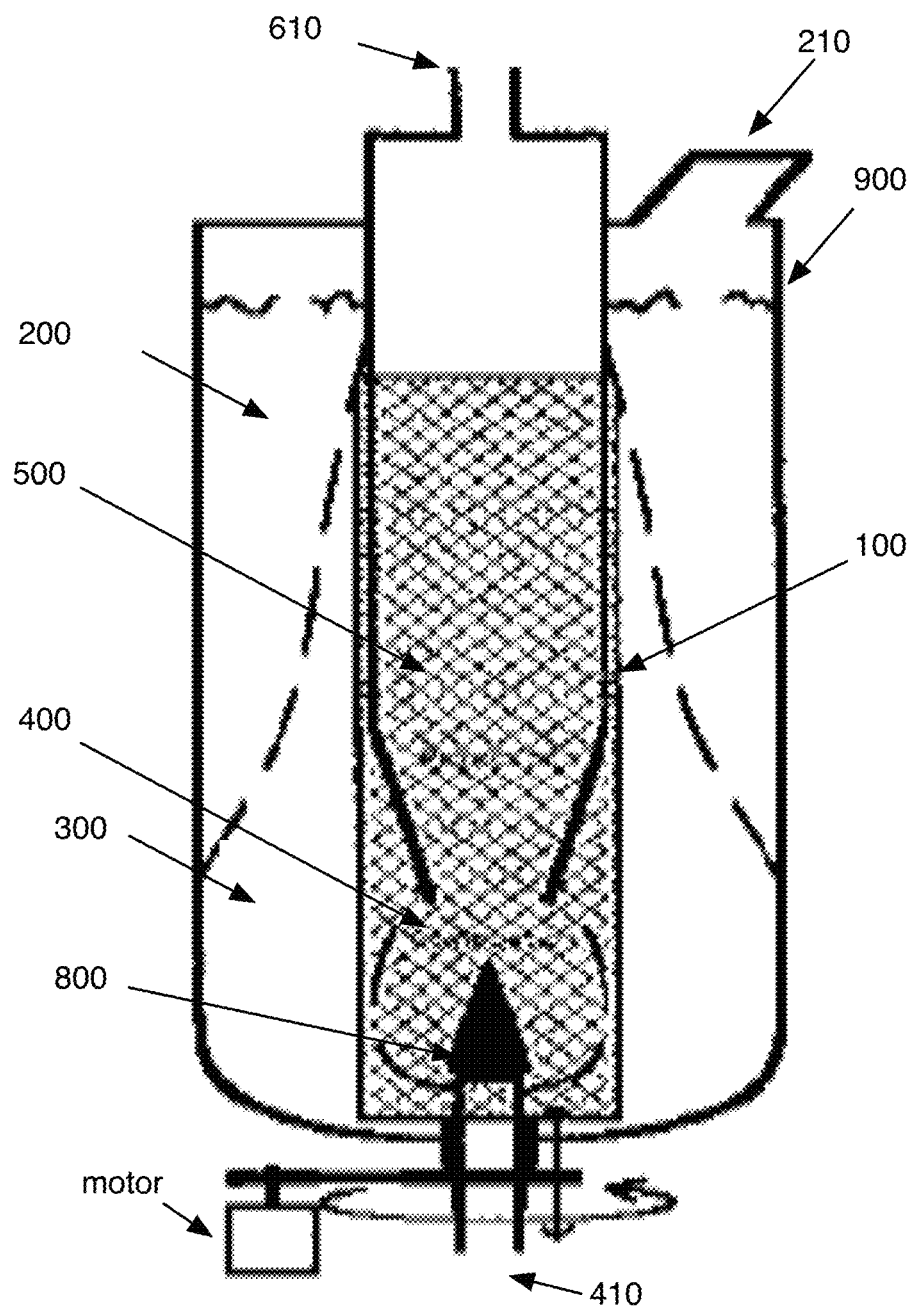
FIG. 3 is a variation of a hybrid fixed kinetic bed gasifier with the char grinder.

The biomass thermal conversion system 10 can be a gasifier, wherein the gasifier can additionally include a reduction zone 500. The char grinder 100 is preferably arranged along the material flow path between the pyrolysis zone 300 and the combustion or reduction zone 500 (e.g., as shown in FIG. 3). The gasifier is preferably utilized within a power generation system that converts gaseous fuel (e.g., syngas) produced by the gasifier into electric power (e.g., with an engine and alternator system), but can alternatively be utilized within a system that extracts biochar, pyrolysis oil, or any other suitable product. Alternatively, the biomass thermal conversion system 10 can be a pyrolysis retort with a char grinder 100 arranged along the combustor (e.g., as shown in FIGS. 1 and 2), or can be any other suitable biomass thermal conversion system 10.

Simultaneous pyrolysis and comminution of biomass confers several benefits over other material reduction methods. First, comminution of the biomass within the pyrolysis phase enables low-energy size reduction of the biomass feedstock. This is due to the inventors' discovery that raw biomass is an order of magnitude stronger than made and cooled charcoal, and that cold charcoal is another order of magnitude stronger and more energy intensive to fragment than hot charcoal at pyrolysis temperatures. Thus, placement of the char grinder 100 in or immediately after the pyrolysis zone 300 allows for sufficient char granulation with a significantly smaller amount of energy input than grinding the unprocessed biomass prior to reactor entry or grinding the charcoal after cooling (e.g., after exiting from the reactor). This discovery allows for low-energy comminution methods to be used in lieu of the high-energy methods used in conventional systems. More specifically, abrasion (e.g., leveraging friction between the biomass particle and an abrading surface) can be used instead of conventional cutting methods. Not only does this reduce the requisite energy input into the system, but this also reduces the need and maintenance of sharp cutting tools, as abrasion can be accomplished with dull components. Furthermore, the use of abrasion to comminute the char reduces the complexity of the machinery.

Second, the inventors have discovered that grinding during pyrolysis results in more uniform pyrolysis of the biomass and allows for lower pyrolysis temperatures to be used, and/or less heat energy input. During conventional pyrolysis, a thermally insulative layer of char forms on the biomass exterior, which typically slows further pyrolysis of the biomass interior. The grinding effectively removes the thermally insulative layer of char as it forms, continually exposing raw biomass to the pyrolysis heat. The result is a more consistent pyrolysis temperature throughout the material and the pyrolysis bed, substantially eliminating localized areas of high or low temperatures, which lead to variability in the made char and/or tar gas characteristics. Additionally, removing the insulative char layer as it forms can result in significant reductions in pyrolysis time, especially with large chunk fuels such as logs and construction debris.

The drying zone 200 of the biomass thermal conversion unit 10 functions to receive and dry wet biomass. The drying zone 200 is preferably a fixed bed to minimize energy expense, but can alternatively be a kinetic bed. The drying zone 200 is preferably fluidly connected to the pyrolysis zone 300, wherein dried biomass is preferably passed to the pyrolysis zone 300. The drying zone 200 can be fluidly connected to the pyrolysis zone 300 by a material transporter that moves dried biomass from the drying zone 200 to the pyrolysis zone 300, or can be arranged above the pyrolysis zone 300, wherein gravity preferably moves dried biomass from the drying zone 200 to the pyrolysis zone 300. The drying zone 200 is preferably a substantially continuous bed with the pyrolysis zone 300 (e.g., coaxially arranged with the pyrolysis zone 300), but can alternatively be a separate bed from the pyrolysis zone 300, wherein the drying zone 200 is preferably offset from the pyrolysis zone 300 such that material transfer between the zones can be controlled. The drying zone 200 is preferably heated by waste heat from the pyrolysis zone 300, but can alternatively be heated by waste heat from the combustion zone 400, the reduction zone 500, the gaseous fuel, the power generation system (e.g., engine exhaust or radiator), or by any suitable waste heat. When the drying zone 200 is heated by waste heat from the reduction zone 500, gaseous fuel, or power generation system, a portion of the waste heat is preferably removed to maintain the drying zone temperature under pyrolysis temperatures. The drying zone 200 preferably includes a biomass inlet 210 that receives wet biomass, wherein the biomass inlet 210 is preferably controlled and maintains a fluid impermeable seal within the gasifier. The biomass inlet 210 can include an airlock (e.g., a rotary airlock), a vent, a sealable lid, or any other suitable mechanism that permits material transfer therethrough while maintaining a substantially fluid impermeable seal. However, the biomass inlet 210 can be substantially open to the ambient environment.

The pyrolysis zone 300 of the biomass thermal conversion system 10 functions to pyrolyze dried biomass. The pyrolysis zone 300 is preferably a fixed bed to minimize energy expense, but can alternatively be a kinetic bed. The pyrolysis zone 300 is preferably fluidly connected to the drying zone 200 and combustion zone 400, wherein dried biomass is preferably passed to the pyrolysis zone 300 from the drying zone 200 and tar gasses are preferably passed to the combustion zone 400 from the pyrolysis zone 300. Char can additionally be passed to the combustion zone 400 from the pyrolysis zone 300. The pyrolysis zone 300, or a portion thereof, is preferably arranged above the combustion zone 400 to leverage gravity in the transfer of char to the combustion zone 400, but can alternatively be arranged adjacent or below the combustion zone 400, wherein a material transporter (e.g., an auger) preferably moves material from the pyrolysis zone 300 to the combustion zone 400. However, the pyrolysis zone 300 can be otherwise arranged. The pyrolysis zone 300 can additionally include a pyrolysis transporter (e.g., an auger) that controls material transfer through the pyrolysis zone 300, but material flow through the pyrolysis zone 300 is preferably passive, wherein the consumption of pyrolysis products by the combustion zone 400 and/or reduction zone 500 preferably move biomass through the pyrolysis zone 300. The pyrolysis zone 300 is preferably heated by waste heat from the combustion zone 400, but can alternatively be heated by waste heat from the reduction zone 500, by waste heat from the gaseous fuel, from waste heat from the power generation system (e.g., engine exhaust or radiator), by a heater, or by any suitable heat.

The combustion zone 400 of the biomass thermal conversion system 10 functions to combust the tar gasses produced from pyrolysis of the biomass. The combustion zone 400 is preferably an open combustion volume, with full mixing of tar gas and air. Alternatively, when tar gas combustion is combined with the char bed, the combustion zone 400 is preferably a kinetic bed to maximize air and tar gas mixing, but can alternatively be a fixed bed or any other suitable char bed configuration. The combustion zone 400 is preferably fluidly connected to the pyrolysis zone 300, wherein tar gas preferably flows to the combustion zone 400 from the pyrolysis zone 300. The combustion zone 400 can additionally be fluidly connected to a reaction zone, wherein cracked tar gasses preferably flow to the reduction zone 500 from the combustion zone 400. Char can additionally be passed to the reduction zone 500 from the combustion zone 400, but can alternatively be passed directly from the pyrolysis zone 300 to the reduction zone 500. Alternatively, char (e.g., comminuted char) can be removed from the machine and not subjected to further reaction, such as when charcoal as an output product (e.g., biochar) is desired. The combustion zone 400 can be substantially continuous with the pyrolysis zone 300, wherein air and heat are directly introduced into a portion of the pyrolysis zone 300 to combust the tar gasses in said pyrolysis zone 300 portion. Alternatively, the combustion zone 400 can be substantially separated from the pyrolysis zone 300 wherein the char of the pyrolysis zone 300 is preferably isolated from the combustion zone 400 by a separate chamber. The combustion zone 400, or a portion thereof, is preferably arranged within or above the pyrolysis zone 300, but can alternatively be arranged below or adjacent the pyrolysis zone 300, wherein the negative pressure (suction) created by the combustion of tar gasses pulls uncombusted tar gasses and/or char from the pyrolysis zone 300.

The combustion zone 400 preferably includes an air manifold 410 that introduces an oxygen-containing gas into the combustion zone 400, and a burner 800 that combusts the tar gas and oxygen within the combustion zone 400. The combustion zone 400 is preferably defined at the outlet of the air manifold 410 within the system. The air outlet can be an opening in a wall of the system, be a nozzle that extends into the system, or be any other suitable air outlet. The air manifold 410 is preferably fluidly connected to an oxygen source at an air inlet 411. The air manifold 410 preferably extends through and is heated by a reaction phase (e.g., the reduction zone 500, the interface between the reduction zone 500 and the drying zone 200, the gas outlet, etc.), but can alternatively extend directly into the combustion zone 400. The air manifold 410 can function to reduce the amount of heat transferred to the drying zone 200, wherein the air manifold 410 extends along the interface between the drying zone 200 and the heat source for the drying zone 200. The air manifold 410 preferably introduces air into the combustion zone 400 such that air flows in a substantially linear path from the combustion zone 400 to the gas outlet (e.g., directly or though through a reduction zone 500), but can alternatively introduce air into the combustion zone 400 such that a rotational/circular airflow pattern is formed within the combustion zone 400. The air manifold 410 preferably directs air toward the gas outlet, but can alternatively direct air away from the gas outlet, wherein the air is turned and directed by a casing end or fixed bed (e.g., of the pyrolysis zone 300) toward the gas outlet (e.g., into the reduction zone 500). The burner 800 functions to heat the combustion zone 400 to the combustion temperatures. The burner 800 can be a flame-generating mechanism, a spark-generating mechanism, a resistive heater, or any other suitable heating element. The burner 800 is preferably directed co-directionally with airflow from the air manifold 410, but can alternatively be directed against the airflow.

When the biomass thermal conversion system 10 is a gasifier, the system can additionally include a reduction zone 500. In these variations of the system, the char grinder 100 is preferably arranged in the material path between the pyrolysis zone 300 and the reduction zone 500. The reduction zone 500 is preferably a kinetic bed to better accommodate the comminuted char, but can alternatively be a fixed bed or any other suitable bed. By grinding the char into a substantially uniform size prior to reduction zone entry and by using a kinetic reduction zone 500, this gasifier confers several advantages over conventional gasifiers. First, this gasifier is capable of accepting, pyrolyzing, and gasifying a large range of biomass sizes without the issues of char bed packing. Second, the uniform char size created by the char grinder 100 allows for better thermodynamics and fluid dynamics within the reduction and combustion phases.

The kinetic reduction zone 500 of the gasifier functions to gasify the combusted tar gasses from the combustion zone 400 into gaseous fuel with char. The reduction zone 500 is preferably a kinetic bed to handle the small char particles, and to increase the surface area of the char available to gasify the cracked tar gasses. The reduction zone 500 is preferably fluidly connected to the combustion zone 400, wherein airflow from the combustion zone 400 preferably flows combusted tar gas into the reduction zone 500. Airflow from the combustion zone 400 can additionally move char from the pyrolysis zone 300 into the reduction zone 500, or the reduction zone 500 can be fluidly connected to and receive char from the pyrolysis zone 300. The received char is preferably in granulated (post-ground) form. The reduction zone 500 is preferably substantially continuous with the combustion zone 400 (e.g., coaxially arranged with the combustion zone 400), but can alternatively be a separate bed from the combustion zone 400. The reduction zone 500 is preferably arranged downstream from the combustion zone 400, but can alternatively be arranged upstream, wherein a casing end or a fixed bed (e.g., the pyrolysis bed) re-routes air from the combustion zone 400 into the reduction zone 500.

The reduction zone 500 is preferably heated by waste heat from the combustion zone 400, but can alternatively be heated by waste heat from the power generation system (e.g., engine exhaust or radiator), by a heater, or by any suitable heat. The reduction zone 500 is preferably thermally coupled to and fluidly isolated from the drying module, wherein waste heat from the gaseous fuel dries the wet biomass. The reduction zone 500 preferably includes a fuel outlet that egresses gaseous fuel, wherein the fuel outlet is preferably controlled and maintains a fluid impermeable seal within the gasifier. The fuel outlet can include a vent (e.g., a passive one-way vent), an airlock, or any other suitable mechanism that permits substantially one-way fluid flow therethrough while maintaining a substantially fluid impermeable seal. However, the fuel outlet can be substantially open.

The simultaneous pyrolysis and communition char grinder 100 functions to reduce a dimension of the solid biomass below a threshold size. More preferably the simultaneous pyrolysis and comminution functions to grind char off the pyrolyzed portions of the solid biomass, wherein the ground char particles are below a threshold size. The ground char particles are preferably a substantially uniform size, but can alternatively be a range of sizes smaller than the threshold size. The threshold size is preferably selected based on the anticipated suspension ability and reaction character in the kinetic reduction zone, but can alternatively be selected in any other suitable manner. The char grinder 100 includes an abrading body 110 and an abrading cage 130, wherein charring biomass is preferably captured by the abrading cage 130 and is ground against the abrading body 110. The ground char preferably passes through the char grinder 100 into the reaction and/or combustion zone 400, but can alternatively travel along the abrading surface of the abrading body 110 and collect at an end of the char grinder 100, wherein said end of the char grinder 100 is preferably fluidly connected to the reduction zone 500, more preferably to the combustion zone 400. Alternatively, the ground char can fall past the abrading body 110 and into a collection device for removal from the system such as in a biochar maker or other pyrolysis-to-charcoal device.

The char grinder 100 is preferably located in the material flow path between the pyrolysis zone 300 and the combustion zone 400, wherein the char grinder 100 can additionally function to separate the pyrolysis zone 300 from the combustion zone 400. The char grinder 100 can additionally or alternatively be located between the pyrolysis zone 300 and the reduction zone 500. The char grinder 100 preferably forms substantially the entire interface between the pyrolysis zone 300 and the combustion and/or reduction zone 500, but can alternatively extend along a portion of the interface. However, the char grinder 100 can be located in the body 110 of the pyrolysis zone 300 (e.g., at an intermediate distance between the drying zone 200 and the combustion zone 400) or at any other suitable location within the gasifier. The char grinder 100 is preferably arranged with the abrading cage 130 proximal the pyrolysis zone 300 and the abrading body 110 proximal the combustion zone 400 (e.g., proximal the combustion and/or reduction zone 500 or distal the pyrolysis zone 300). The abrading cage 130 preferably translates (e.g., reciprocates, rotates, etc.) relative to the abrading body 110, wherein a motor or other translation device preferably controls abrading cage translation. The abrading body 110 is preferably statically coupled to the remainder of the biomass thermal conversion system 10, such as to the pyrolysis unit (e.g., welded, screwed, or otherwise mounted to the gasifier body 110), but can alternatively translate relative to the reactor body 110, wherein the abrading cage 130 is preferably statically coupled to the conversion system. The abrading cage 130 preferably translates relative to the abrading body 110 at a relatively slow speed (e.g., 1-10 RPM), but can alternatively translate against the abrading body 110 at any suitable speed. The char grinder 100 is preferably thermally conductive, and preferably heats the captured biomass with heat from the combustion zone 400 and/or reduction zone 500, but can alternatively be thermally insulative, wherein the char grinder 100 can function to insulate the pyrolysis zone 300 or substantially reduce the heat transfer from the combustion zone 400 to the pyrolysis zone 300.

The abrading body 110 of the char grinder 100 functions to provide a surface that the char can be ground against. The abrading body 110 is preferably substantially solid and continuous, but can alternatively include through holes (apertures), wherein the abrading body 110 functions as a screening device in which the through holes are preferably substantially equivalent to the desired char particle size. However, the char grinder 100 can include any other suitable screening device that retains the char particle on the side of the char grinder 100 proximal the pyrolysis zone 300 until the desired char particle size is reached. The desired char particle size is preferably selected based on the anticipated suspension ability of the reduction zone 500 or the desired char size as an end product out of the pyrolysis device. The abrading body 110 preferably includes an abrading surface arranged adjacent the abrading cage 130. The abrading surface is preferably substantially smooth, but can alternatively be textured to facilitate grinding. The abrading surface texture preferably includes raised segments extending out of the abrading surface toward the abrading cage 130, but can alternatively include recessed segments. The abrading surface texture can include cross-hatching, raised circular portions, sandpaper, angled teeth, or any other suitable texture. The abrading surface texture is preferably manufactured as a singular piece with the abrading body 110, but can alternatively be coupled to the abrading surface after abrading body 110 manufacture (e.g., by adhesion, welding, etc.). The abrading body 110 can be cylindrical, conical, flat (e.g., prismatic), wavy, or have any other suitable shape. When the abrading body 110 is curved, the abrading surface is preferably the convex side of the abrading body 110, but can alternatively be the concave side of the abrading body 110.

The abrading cage 130 of the char grinder 100 functions to capture biomass and to move the biomass against the abrading body 110, more preferably to grind the char from the biomass against the abrading body 110. In operation, the abrading cage 130 grinds the char against the abrading body 110 and against adjacent biomass particles in the vessel. The resistance applied by the abrading body 110, abrading cage 130, and adjacent biomass particles, preferably strips the pyrolyzed portions of the biomass off the particle being ground. The form of the abrading cage 130 and edges of the abrading cage 130 work to grind the char, as does the surface (e.g., broad face) of the abrading body 110. The edges of the abrading cage 130 can be substantially dull, but can alternatively be sharp. The abrading cage 130 preferably includes a singular piece with a plurality of through-holes, wherein the through-holes are preferably dimensioned to capture and grind biomass. The through-holes can have a size or dimension selected based on the maximum biomass size that the conversion system is configured to receive, the size/dimension of char that is desired to be passed forward within the system, or can be based on any other suitable charred biomass parameter. The abrading cage 130 holes can have a circular, polygonal (e.g., regular convex polygon, concave polygon, rectangular, rhomboid, etc.), or any other suitable perimeter. The abrading cage 130 can be removably coupled to the abrading body 110, such that various abrading cages 130 with different hole dimensions can be interchanged. Alternatively, the hole dimensions of the abrading cage 130 can be adjustable. Common abrading cage materials include expanded or perforated metal sheet, but the abrading cage 130 can alternatively be made of any suitable material. The abrading cage 130 preferably includes a second abrading surface arranged adjacent the abrading body 110. The second abrading surface is preferably substantially smooth, but can alternatively be textured to facilitate grinding. The second abrading surface texture preferably includes raised segments extending out of the abrading surface toward the abrading body 110, but can alternatively include recessed segments. The second abrading surface texture can include cross-hatching, raised circular portions, sandpaper, angled teeth, or any other suitable texture. The second abrading surface texture preferably complements the abrading surface texture of the abrading body 110, but can alternatively oppose the abrading surface texture of the abrading body 110. The second abrading surface texture is preferably manufactured as a singular piece with the abrading cage 130, but can alternatively be coupled to the abrading surface after abrading cage manufacture (e.g., by adhesion, welding, etc.). The abrading cage 130 preferably complements the profile of the abrading body 110. More preferably, the abrading cage 130 traces the profile of the abrading surface. However, the abrading cage 130 can be otherwise configured. The abrading cage 130 can be cylindrical, conical, flat (e.g., prismatic), wavy, or have any other suitable shape. When the abrading cage 130 is curved, the second abrading surface is preferably the concave side of the abrading cage 130 (especially when the abrading surface is on the convex side of the abrading body 110), but can alternatively be the concave side of the abrading cage 130. The abrading cage 130 can translate along the longitudinal axis of the abrading body 110, but can alternatively translate perpendicular to the longitudinal axis of the abrading body 110, translate in an arcuate direction about the abrading body 110 (e.g., roll about the abrading body 110), or translate in any suitable manner relative to the abrading body 110.

2. Examples of Biomass Thermal Conversion Systems Including the Char Grinder

In a first example of the biomass thermal conversion system 10 as shown in FIG. 1, the biomass thermal conversion system 10 is a horizontal pyrolysis retort reactor, wherein the combustion zone 400 is surrounded by the pyrolysis zone 300 and the char grinder 100 substantially surrounds the combustion zone 400, separating the combustion zone 400 from the pyrolysis zone 300. The pyrolysis zone 300 is preferably defined by a casing 900, wherein the casing 900 additionally includes a retort tube 910 that is substantially sealed from and surrounded by the biomass material under pyrolysis. Combustion preferably occurs within the retort tube. The casing 900 preferably additionally defines the drying module, such that the drying stage and pyrolysis stage are mixed within a single module. However, the pyrolysis stage can be fed by a drying module separate from the casing 900. The combustion zone 400 is preferably arranged at a second end of the casing 900, distal and opposing the first end of the casing 900. The first end of the casing 900 preferably opposes the second end of the casing 900 along a gravity vector, wherein the second end of the casing 900 is preferably lower than the first end. The combustion zone 400 preferably extends along the length of the second end of the casing 900, but can alternatively extend along a portion of the second end of the casing 900, extend at an angle to the second end of the casing 900, or extend in any suitable arrangement relative to the second end of the casing 900. The combustion zone 400 can additionally extend along the width of the casing 900 or along a portion of the casing width. The combustion zone 400 is preferably separated from the second end of the casing 900 by a collection area, wherein char preferably flows around the retort tube, around and through the char grinder 100 into the collection area. The second end of the casing 900 can additionally include a char transportation mechanism (e.g., an auger) that moves the comminuted char to the char outlet. Alternatively, the second end of the casing 900 can be removable from the body 110 of the casing 900, such that biochar can be collected from the collection area. The combustion zone 400 can additionally separate the collection area from the pyrolysis zone 300. The combustion zone 400 is preferably proximal a first side of the casing 900 (preferably normal to the second end of the casing 900, but alternatively otherwise arranged), wherein the first side of the casing 900 preferably includes an air manifold 410 fluidly connected to an oxygen source (e.g., an oxygen tank or ambient environment), a tar gas manifold 430 fluidly connected proximal the first end of the casing 900, and a burner 800 located at the end of the air manifold 410 within the casing 900. The char grinder 100 preferably encircles the retort tube 910, but can alternatively trace a portion of the retort tube 910. The char grinder 100 preferably includes a substantially solid abrading body 110, wherein the char ground at the interface between the pyrolysis zone 300 and the combustion zone 400 flows around the combustion zone 400 into the collection area. The abrading cage 130 is preferably rotated about a longitudinal axis of the abrading body 110 by a motor or any other suitable translation device, preferably at 1-10 rpm but alternatively faster or slower. However, the abrading cage 130 can translate in any suitable manner relative to the abrading body 110.

In a second example of the biomass thermal conversion system 10 as shown in FIG. 2, the biomass thermal conversion system 10 is a slanted pyrolysis retort reactor, wherein the retort tube 910 extends at an angle to a gravity vector along a first end of a casing 900 defining a pyrolysis zone 300. The first end of the casing 900 can additionally function as a first side of the retort tube 910 defining the combustion zone 400. The first end of the casing 900 preferably additionally functions as a thermal interface between the pyrolysis zone 300 and the combustion zone 400. The char grinder 100 is preferably located along the first end of the casing 900. The abrading cage 130 of the char grinder 100 preferably traces the first end of the casing 900, and is preferably a substantially flat plate but can alternatively be a curved plate or have any other suitable geometry. The first end of the casing 900 preferably functions as the abrading body 110. The abrading cage 130 is preferably reciprocated along a longitudinal axis of the first end of the casing 900 by a motor or any other suitable translation device, preferably at 1-10 rpm but alternatively faster or slower. However, the abrading cage 130 can translate in any suitable manner relative to the first end of the casing 900. The first end of the casing 900 can be perforated and fluidly connect the chamber defining the combustion zone 400 with the pyrolysis zone 300, wherein char falls down the angled slope and can be collected through the char outlet. The first end of the casing 900 can be perforated along its entire length, or can be perforated along a portion of its length. Alternatively, the first end can be substantially solid and continuous, wherein ground char preferably collects at the lower end of the pyrolysis zone 300 and can be removed from the system through a char outlet. The chamber preferably includes a biomass inlet 210 that receives fuel from a drying module located on the second end of the casing 900, wherein the second end of the casing 900 preferably opposes the first end of the casing 900 (e.g. at the top of the chamber). The chamber preferably includes an air manifold 410 fluidly connected to a first end of the chamber distal the biomass inlet 210. The first end of the chamber and/or the air manifold 410 can be fluidly connected to the pyrolysis zone 300 proximal the second end of the casing 900 by a tar gas manifold 430, wherein the tar gas manifold 430 transfers tar gas created during pyrolysis to the combustion zone 400. The first end of the casing 900 additionally includes a burner 800 that combusts the injected air and tar gas. The chamber preferably additionally includes a char outlet at the lowest point of the gravity vector, although the char outlet can be located at any other suitable position.

In a third example of the biomass thermal conversion system 10 as shown in FIG. 3, the biomass thermal conversion system 10 is a hybrid fixed kinetic gasifier, wherein the drying zone 200 and pyrolysis zone 300 are located within a fixed bed, and the combustion zone 400 and reduction zone 500 are located within a kinetic bed. The fixed bed preferably surrounds the kinetic bed, but can alternatively be surrounded by the kinetic bed. The gasifier is preferably arranged with a longitudinal axis parallel to a gravity vector, wherein the drying zone 200 is preferably arranged above the pyrolysis module. However, the gasifier can be arranged horizontally or at any suitable angle relative to a gravity vector. The char grinder 100 preferably separates the pyrolysis zone 300 from the combustion zone 400 and reduction zone 500. The char grinder 100 preferably encircles the combustion zone 400 and reduction zone 500, wherein the air manifold 410 preferably extends within or directs air into the lumen defined by the char grinder 100. However, the char grinder 100 can be otherwise oriented. The char grinder 100 preferably includes a perforated abrading body 110 such that only ground char and tar gasses can enter the combustion zone 400, and subsequently, the reduction zone 500. The abrading body 110 is preferably a separate piece from the chamber defining the reduction zone 500, but can alternatively be a portion of the chamber, be a continuation of the chamber, be fixed to the chamber, extend from an end of the casing proximal the combustion chamber, or be otherwise arranged within the reactor. The abrading cage 130 preferably rotates about the abrading body 110, but can alternatively slide linearly along a longitudinal axis of the abrading body 110 or otherwise translate relative to the abrading body 110. The abrading cage translation is preferably driven by a motor or any other suitable translation mechanism, and preferably translates at a rate of 1-10 rpm but can alternatively translate faster or slower.

Figure 4:
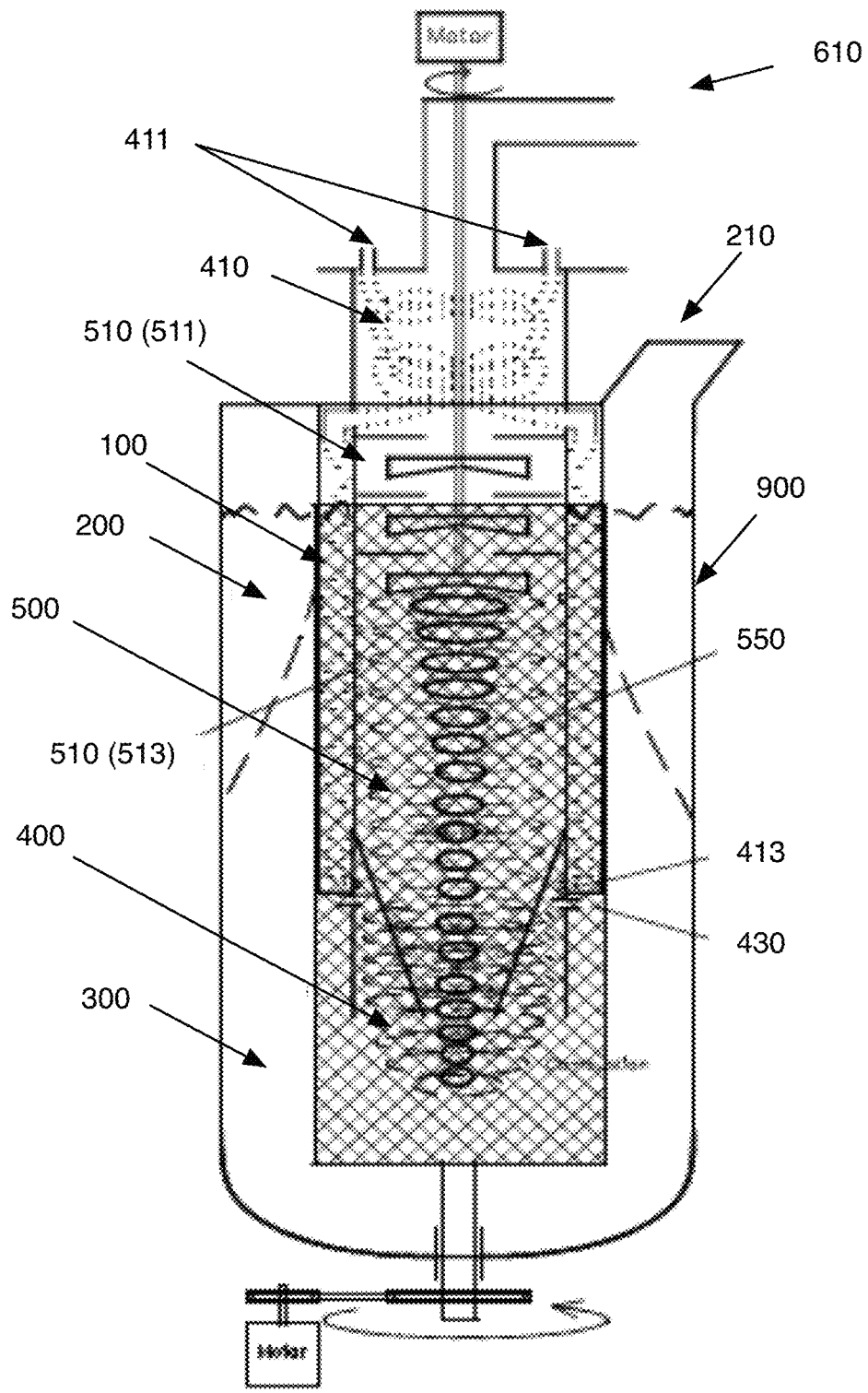
FIG. 4 is a variation of a cyclonic hybrid fixed kinetic bed gasifier with the char grinder.
Figure 5:
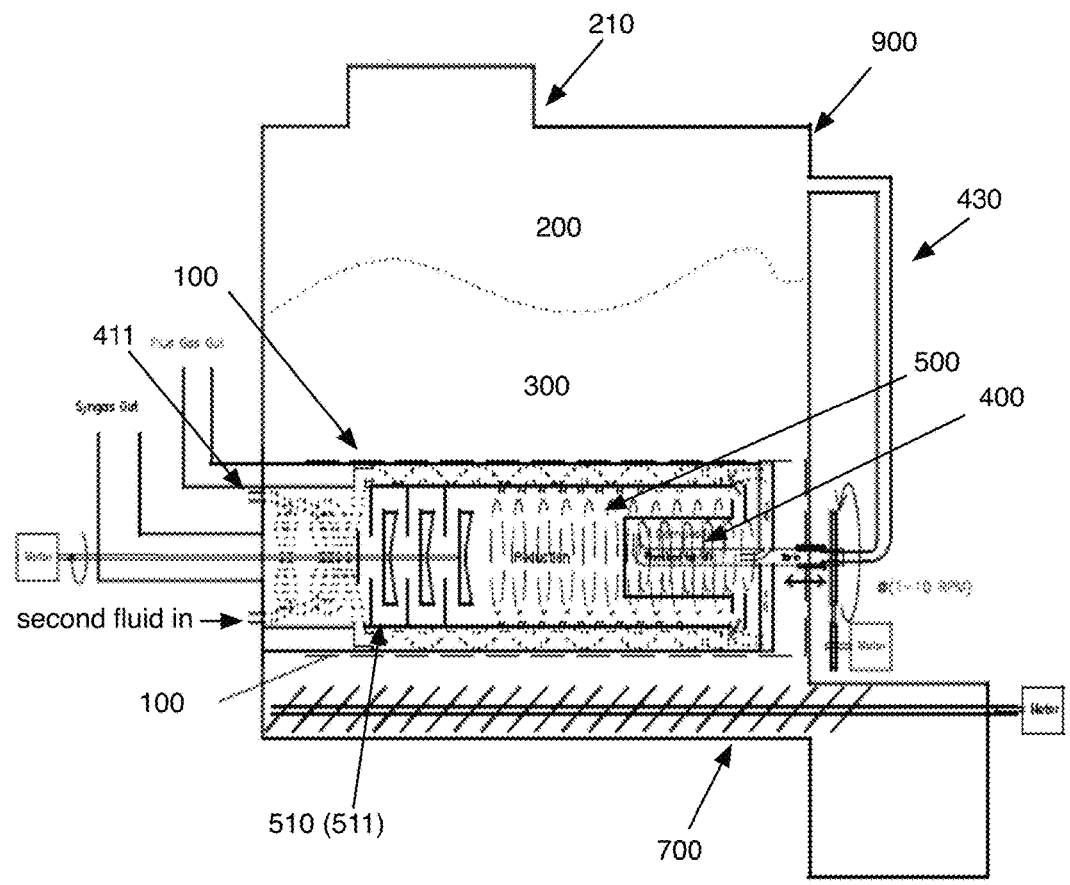
FIG. 5 is a variation of a cyclonic hybrid fixed kinetic bed gasifier with the char grinder enabling indirect gasification.

The kinetic bed of the hybrid gasifier can be a fluidized bed (e.g., as shown in FIG. 3), a swirl or cyclonic bed (e.g., as shown in FIGS. 4 and 5), a centrifugal bed, or any other suitable kinetic bed. The combustion airflow is preferably directed upward (e.g., against the gravity vector), such that the reduction zone 500 is arranged upstream and above the combustion airflow. However, the combustion airflow can alternatively be directed in any other suitable direction, wherein the combustion airflow is preferably directed toward the reduction zone 500. The combustion zone 400 is preferably arranged adjacent the lower portion of the pyrolysis zone 300, wherein the combustion zone 400 is defined downstream from the air manifold termination. The air manifold 410 feeding the combustion zone 400 can direct combusting gasses and/or biomass toward the reduction zone 500, or can direct combusting gasses and/or biomass from the reduction zone 500 (e.g., along a gravity vector), wherein the casing defining the fixed bed and/or the fixed bed turns and redirects the combusted gasses toward the reduction zone 500. The gas flow within the combustion zone 400 can be linear, rotational, or have any suitable flow pattern. The combustion zone 400 preferably additionally includes a burner 800 at the air outlet 413 of the air manifold 410 that heats the air and tar gasses to combustion temperatures. The combustion zone 400 is preferably substantially materially isolated but fluidly connected to the pyrolysis zone 300, but can alternatively be materially continuous with the pyrolysis zone 300. The reduction zone 500 is preferably a kinetic bed as well, and can be a fluidized bed (e.g., as shown in FIG. 3), a cyclonic bed (e.g., as shown in FIGS. 4 and 5), a centrifugal bed, or any other suitable kinetic bed. In some variations of the gasifier, the reduction zone 500 can additionally include a particulate separation mechanism 510. The particulate separation mechanism 510 is preferably a rotary blower 511 with vanes 513 that collect and bias char particulates against the walls defining the reduction zone 500 (e.g., as shown in FIGS. 4 and 5), but can additionally or alternatively include vanes extending from said walls that guide char back toward the combustion zone 400, baffle plates that create a tortuous flow path that collect the char, or any other suitable particulate separation mechanism 510. The particulate separation mechanism 510 can additionally control the flow patterns within the reduction zone 500. The reduction zone 500 is preferably substantially separate from the combustion zone 400.

In one variation of a gasifier having a cyclonic bed as shown in FIG. 4, the reduction zone 500 is separated from the combustion zone 400 by a cone, In this variation, the combined swirl flow of the combustion zone 400 and the rotary blower creates a spouted vortex kinetic bed. Char is comminuted as biomass is forced against the char grinder 100, and falls down into the second closed end of the casing defining the gasifier. Comminuted char is pulled into the reduction zone 500 by the cyclonic airflow stemming from the combustion zone 400 and reduction zone gas flow, spins outward onto the reduction zone walls, and is directed back downward into the cone by the rotary blower, in combination with the spiral directing vanes on the walls of the reduction riser. Subsequent airflow from the combustion zone 400 into the reduction zone 500 creates a spouted vortex 550 out of this collected bed in the cone. The gasifier can additionally include a char removal mechanism 700 arranged below or proximal the center channel that removes char prior to char entry into the reaction zone for an external use (such as biochar). The char removal mechanism 700 preferably includes a char collector that functions to retain the char within or removed from the gasifier. The char collector is preferably arranged below the grinding mechanism along a gravity vector, but can alternatively be arranged at any other suitable location relative to the gasifier. The char collector is preferably mounted to the gasifier, but can alternatively be removably coupled to the gasifier or distal the gasifier. The char removal mechanism 700 can additionally include a char transportation mechanism, such as an auger, belt, conveyor, or any other suitable transportation mechanism that transports char from the char collector or any other suitable portion of the gasifier to a secondary container distal the gasifier.

In another variation of the gasifier as shown in FIG. 5, the hybrid gasifier is a cyclonic gasifier that is oriented at an angle to a gravity vector, more preferably oriented perpendicular (e.g., horizontal) to the gravity vector. The gasifier includes a casing 900, a channel arranged coaxially within the casing 900 and extending horizontally along a portion of the casing width from the first end of the casing 900, a combustion container arranged in the end of the channel proximal the second end of the casing 900, a first air manifold 410 that introduces air into the combustion chamber, and a flue gas manifold extending from the combustion container, more preferably along the channel length toward the first end of the casing 900. The channel interior is preferably fluidly connected to the space between the channel and the casing 900. The first air manifold 410 is preferably angled relative to the channel longitudinal axis, and preferably introduces air tangentially into the combustion chamber such that a rotary flow is induced. The gasifier can additionally include a particulate separation mechanism 510, such as a rotary blower, arranged within the first end of the channel, wherein the rotary blower recycles char toward the second fluid manifold inlet within the channel interior. The gasifier can additionally include a tar recycling manifold 430 fluidly connecting a portion of the casing 900 above the channel (e.g., along a gravity vector) to the combustion container. The gasifier can additionally include a char grinder 100 encircling the channel for in-situ size reduction of feedstock, wherein the char grinder 100 is preferably driven by a motor. The reduction zone 500 is fluidly connected to and receives comminuted char from the char grinder 100, wherein the char preferably flows through the char grinder 100 and into the reaction zone. Alternatively, the granulated char can flow around the char grinder 100 into a collection zone. The gasifier can additionally include a char removal mechanism arranged below the channel, so as to remove char before it enters the reaction zone, for an external use (such as biochar). The gasifier can additionally include an indirect gasification mechanism that functions to remove combusted tar gas from the gasifier prior to reduction, and to use the heat from the combusted tar gas to heat a second fluid stream (usually steam) that is used to reduce the char into fuel. Indirect gasification is achieved by the following combination of elements. A combustion container fluidly separates the combustion zone 400 from the reduction zone 500, with the combustion container arranged within the end of the channel proximal the second closed end of the casing 900. The combustion container can be static or mobile. The combustion container is preferably arranged within the channel such that a char inlet is created between the channel and the combustion container (e.g., the channel interior is fluidly connected to the pyrolysis zone 300). The combustion container preferably has an outlet fluidly connected to a flue gas manifold. The flue gas manifold is preferably thermally connected to a second fluid manifold. The second fluid manifold is preferably fluidly connected to the channel interior (e.g., the reduction zone 500). The second fluid manifold can only transfer the second fluid or can transfer the second fluid and an oxygen-laden fluid source (e.g., ambient air). The second fluid manifold and flue gas manifold are preferably arranged such that cross-flow is induced between the respectively contained fluids, but can be alternatively arranged. In operation, tar gas is extracted from the gasifier (e.g., from a point above the pyrolysis zone 300, relative to a gravity vector) and fed into the combustion container. The tar gas is combusted within the combustion container and the resultant gas flows into the flue gas manifold, wherein the flue gas exchanges heat with the incoming second fluid (e.g., steam). The waste heat from the flue gas can additionally function to heat the pyrolysis zone 300. The second fluid flows into the reduction zone 500 (e.g., channel interior) and is reduced into gaseous fuel, which preferably subsequently flows out of the gasifier through a fuel outlet 610. This indirect gasification method enables the gasifier to run in a variety of modes, from full syngas output without nitrogen dilution, to mixed char and gas output, to full char output by means of operating the gasifier as a pyrolysis retort.

As a person skilled in the art will recognize from the previous detailed description and from the figures and claims, modifications and changes can be made to the preferred embodiments of the invention without departing from the scope of this invention defined in the following claims.

I claim:

1. A biomass thermal conversion system comprising:
   a fixed bed drying zone;
   a fixed bed pyrolysis zone fluidly connected to the drying zone;
   a combustion zone fluidly connected to the pyrolysis zone at an interface;
   a comminution mechanism arranged as the interface, configured to grind char off a pyrolyzed surface of solid biomass and reduce a dimension of the solid biomass below a threshold size through the interface;

wherein the comminution mechanism encircles the combustion zone, wherein the pyrolysis zone surrounds the comminution mechanism.

2. The system of claim 1, further comprising a casing comprising a solid material inlet, the casing defining the drying zone proximal the solid material inlet and defining the pyrolysis zone distal the solid material inlet across the drying zone.

3. The system of claim 2, further comprising an insert extending through the drying and pyrolysis zones and fluidly connected to the combustion zone, the insert defining a reduction zone.

4. The system of claim 2, further comprising a char transportation mechanism distal the solid material inlet proximal the comminution mechanism and arranged below the comminution mechanism along a gravity vector, the char transportation mechanism fluidly connected to a char collection mechanism.

5. The system of claim 1, wherein the comminution mechanism comprises an abrading body and an abrading cage, wherein the abrading cage is configured to translate along a broad face of the abrading body.

6. The system of claim 5, wherein the abrading body is solid and continuous.

7. The system of claim 5, wherein the broad face comprises an abrading textured surface.

8. The system of claim 5, wherein the abrading cage comprises retention features configured to retain pyrolyzed material having a dimension larger than the threshold size.

9. The system of claim 8, wherein the retention features comprise apertures through a thickness of the abrading cage.

10. The system of claim 5, wherein the grinding mechanism further comprises a motor operatively connected to the abrading cage, the motor configured to translate the abrading cage relative to the abrading body.

* * * * *